United States Patent [19]

Lemelson

[11] 4,034,495
[45] July 12, 1977

[54] INFLATABLE TOY

[76] Inventor: Jerome H. Lemelson, 85 Rector St., Metuchen, N.J. 08840

[21] Appl. No.: 556,976

[22] Filed: Mar. 10, 1975

Related U.S. Application Data

[63] Continuation-in-part of Ser. No. 238,570, March 27, 1972, Pat. No. 3,884,554, which is a continuation-in-part of Ser. No. 849,177, Aug. 11, 1969, Pat. No. 3,684,614.

[51] Int. Cl.² .......................................... G09F 19/14
[52] U.S. Cl. .................................... 40/137; 46/87
[58] Field of Search ............. 40/137, 126 R, 126 B, 40/125 M, 129 B, 106.51, 106.52; 46/87, 88

[56] References Cited

U.S. PATENT DOCUMENTS

| 1,567,132 | 12/1925 | Gill ........................................ 46/87 |
| 2,170,539 | 8/1939 | Schoberg ............................... 46/87 |
| 2,482,947 | 9/1949 | Swarbrick .............................. 40/137 |
| 2,927,383 | 3/1960 | Longino .................................. 46/88 |
| 3,026,648 | 3/1962 | Lemelson ............................... 46/87 |
| 3,686,782 | 8/1972 | Erickson ............................. 46/87 X |

FOREIGN PATENT DOCUMENTS

| 893,680 | 4/1962 | United Kingdom .................. 46/87 |

*Primary Examiner*—John F. Pitrelli

[57] ABSTRACT

Structures are provided in inflatable toys having eye-catching optical effects. In one form of the invention, an added section of transparent flexible plastic is heat sealed to the outer wall of an inflatable enclosure and contains printed matter which cooperates with printed matter on the outer surface of the inflatable enclosure directly aligned therewith to provide interference effects which appear to change as the angle of sight of the observer and the inflatable assembly varies.

In another form, an inflatable enclosure is made of transparent flexible plastic material and contains printed grid lines or other forms of printing having spaces or interstices provided on opposite surfaces of the inflatable enclosure and may be viewed directly through the enclosure so as to generate interference patterns.

The invention is also concerned with an inflatable display or lamp containing an electric light secured within an inner wall of the enclosure which is exterior of the inflated volume.

10 Claims, 7 Drawing Figures

INFLATABLE TOY

RELATED APPLICATIONS

This is a continuation-in-part of application Ser. No. 238,570 filed Mar. 27, 1972 for Display Sheet Material & Method, now U.S. Pat. No. 3,884,554, which was a continuation-in-part of Ser. No. 849,177 filed Aug. 11, 1969, now U.S. Pat. No. 3,684,614.

SUMMARY OF THE INVENTION

This invention relates to inflatable structures which are particularly applicable in the fabrication of inflatable toys and the like. In particular, the invention is concerned with simple means for generating variable optical effects to an observer viewing the inflated toy so as to render the object eye-catching and attractive.

In the construction of inflatable toys, it is most desirable to provide an article which is attractive to the eye and attention-getting. Heretofore, this function has been primarily filled by attractively shaping and coloring the inflatable article.

Accordingly, it is a primary object of this invention to provide new and improved structures in inflatable toys and the like, which structures contain means for diffracting and changing like patterns to an observer whose line of sight shifts relative to the inflatable article.

Another object is to provide a relatively inexpensive means for decorating the surface of an inflatable article in such a manner as to generate eyecatching interference effects.

Another object is to provide an inflatable object containing means for generating interference bands wither by looking directly through the object or against a patch of flexible material sealed to the surface thereof.

Another object is to provide simple means for generating a three-dimensional or interference effects on the surface of a flexible inflatable article.

Another object is to provide a new and improved structure in an inflatable lamp or display.

With the above and such other objects in view as may hereinafter more fully appear, the invention consists of the novel construction, combination and arrangement of parts, as will be hereinafter more fully described and illustrated in the accompanying drawings wherein are shown embodiments of the invention, but it is to be understood that changes, variations and modifications may be resorted to which fall within the scope of the invention as claimed.

Figure 1:
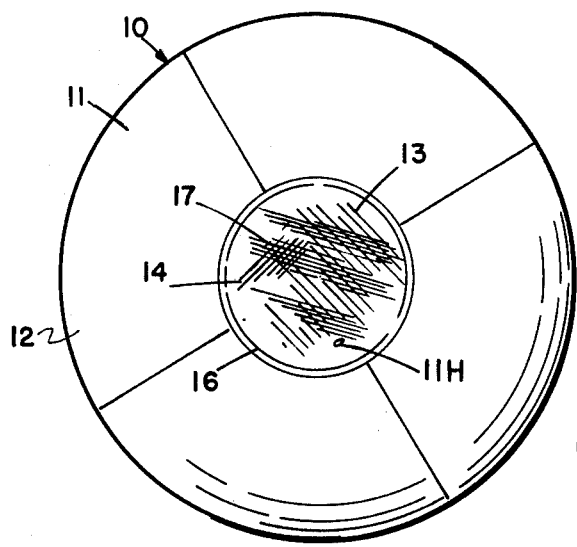
FIG. 1 is an end view of an inflatable ball constructed with a portion operative to generate interference effects.
Figures 2, 3:
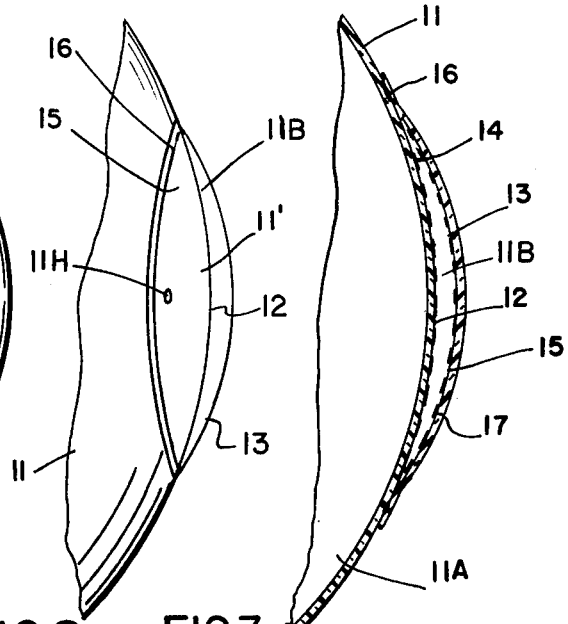
FIG. 2 is a fragment of an isometric view taken from one side of the ball of FIG. 1 wherein the wall structure is shown without printing for clarity.
FIG. 3 shows a fragment of a side cross-ectional view of the portion of the ball shown in FIG. 2.

There is shown in FIGS. 1–3 an inflatable toy 10 in the shape of a sphere or ball 11 made of a plurality of segments 12 which are heat sealed together which, when suitably inflated, form a sphere which may be used as a play ball. Sealed to a portion of the wall of the ball 10 is a circular patch 14 of transparent or translucent flexible plastic sheeting which is shaped and sealed such that it will bulge outwardly a slight degree from the outer surface 11' the main inflated wall 11 when the inflatable assembly 10 is inflated. A small opening or hole 17 provided in the wall 12 of the main inflated body 11 in direct alignment with the sealed-on patch 13 permits inflation air which is pumped or blown into the main interior volume 11A of the inflatable body to enter the volume 11B defined between the main wall of the inflatable and the patch 13.

Printed on the outside surface 12 of that portion of the wall 11 of the inflatable assembly 10 in direct alignment with the sealed-on patch 13 is a first illustration composed, as shown in FIGS. 1 and 3, of a plurality of grid lines 14. Printed on the inside surface 15 of patch 13 are a plurality of grid lines 17 which are arranged and directed such that when an observer looks at the transparent patch 13, he may not only see the material printed on both surfaces but will also observe an interference effect such as a fringe pattern generated by the interference of light passing between the interstices 18 between the grid lines 17. The matter printed on the surfaces of sheet members 11 and 13 may comprise opaque or translucent material defined as a plurality of parallel lines or grid formations varying from perhaps 1/16 inch thick to 100 or more lines per inch. If the printed matter on the two sheets is composed of respective sets of parallel lines, depending on the relative angulation of said lines, the various interference or fringe pattern effects may be generated to an observer looking through the patch 13. I have discovered that by varying the angle between the respective sets of grid lines in the range of about 3° to 20° or so, interference bands will be generated which will appear to move as the angle between the observer and the assembly 10 changes in a direction angulated or normal to at least one of the sets of lines. At angles of between 3° and 6°–10°, relatively wide interference bands are generated which appear to move relatively faster than those generated when the angle varies above 10°. As the angle increases, the width of the interference bands decreases and the apparent rate of motion decreases per unit of angular variation between the observer's eyes and the assembly.

The illustrations printed on the surfaces 12 and 15 may also include cross-hatchings or screen-like formations on either or both surfaces or combinations of screen-like formations, grid lines and/or space-separated spots. The grid lines 15 and 17 may also be printed on the inside and outside surfaces of members 11 and 13 to generate suitable eyecatching interference effects.

While the inflatable enclosure 10 of FIGS. 1–3 is illustrated as a sphere or ball, it may of course have any suitable shape, as may the patch 13 which is heat sealed thereto. For example, the patch 13 may extend as a band or strip completely around the inflatable enclosure and may be heat sealed to the wall of the enclosure in any suitable configuration or series of configurations. In addition to a circular sealing line such as 16 of FIGS. 1–3, the patch may be heat sealed to provide a quilt-like effect and a plurality of sub-chambers with outer walls which respectively protrude outwardly from the lateral seal lines.

Figure 4:
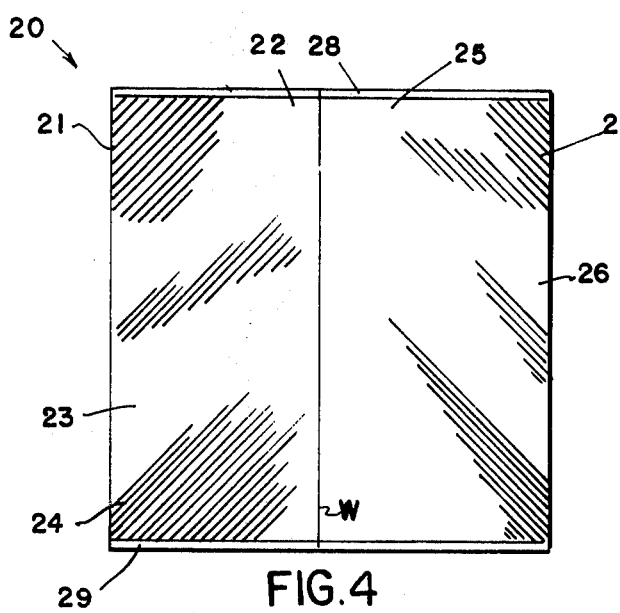
FIG. 4 is a side view of a composite inflated structure formed as a cylinder of transparent, flexible plastic material containing space separated lines or bans printed around the side wall to generate interference effects when viewing directly through the inflated structure.

In yet another embodiment of the invention illustrated in FIG. 4, a variety of interference or fringe pattern effects may be derived by producing an inflatable article having opposite walls made of transparent flexible plastic material containing screen-like printings thereon so that when an opposite wall portion is viewed through a near wall portion as the angle of incidence changes, a dynamic, moving optical effect will be observed such as the illusion of moving interference bands. In FIG. 4, an inflatable object 20 contains a side wall 21 which is substantially cylindrical in shape when the enclosure is inflated and is composed of respective rectangular portions 22 and 25 which are joined at their ends by heat sealing lines W and are joined along their lateral edges to top and bottom walls 28 and 29 containing stiffener discs for defining the cylindrical shape and causing said end walls to be retained substantially flat. The outer surface 23 of side wall portion 22 contains a plurality of grid lines 24 and the outer surface 26 of opposite side wall portion 25 contains its own grid lines 27. The grid lines 24 and 27 are so angulated with respect to each other as to create interference effects when an observer looks through the transparent portions of the near side wall at the transparent and lined portions of the opposite side wall. Such effects may be characterized by the illusion of movement of bands of light in one or a plurality of directions depending upon the exact characteristics of the illustrations provided on opposite side walls. In addition to grid lines, for example, cross-hatched lines, and a variety of other shapes defined by equally spaced or variably spaced straight or curved lines, spots or other designs extending across the inside or outside surfaces of the opposite walls and serving to break up, interrupt or diffract light passing completely through the inflated enclosure.

In addition to grid lines or gratings printed on opposite wall portions of the inflatable enclosure 20, screen-like designs and the like may also be provided to generate a variety of interference and moving optical effects.

Figures 5, 6:
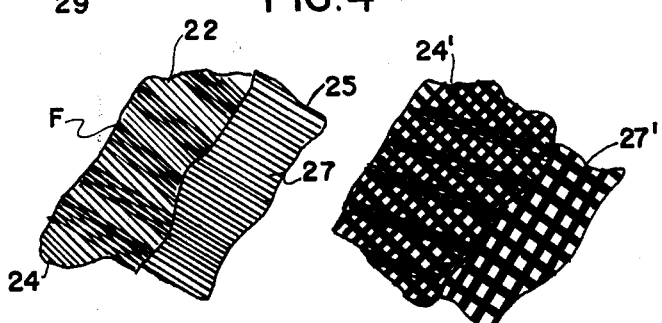
FIG. 5 is a view of portions of the inflated structures of FIGS. 1–4, which portions contain printed grid lines angulated with respect to each other to generate interference bands.
FIG. 6 shows a lined portion of inflated plastic sheeting defining a structure such as one of those illustrated in FIGS. 1 to 4 and containing cross-grid lines or screening printed on both sheets to generate interference effects.

FIGS. 5 and 6 illustrate certain optical effects which are derivable by any of the structures described in FIGS. 1–4. In FIG. 5, the opposite walls 22 and 25 of the enclosure of FIG. 4 are shown containing grid lines 24 and 27 which are slightly angulated, as described, with respect to each other to generate interference bands denoted F. This same combination may also be applied to the structures found in FIGS. 1–3.

In FIG. 6, the opposite walls or adjacent portions of transparent plastic are provided with screen-like printings 24' and 27' which generate moving optical effects in a structure of the type shown in FIG. 4 and interference bands in structures of the type shown in FIGS. 1–3.

Figure 7:
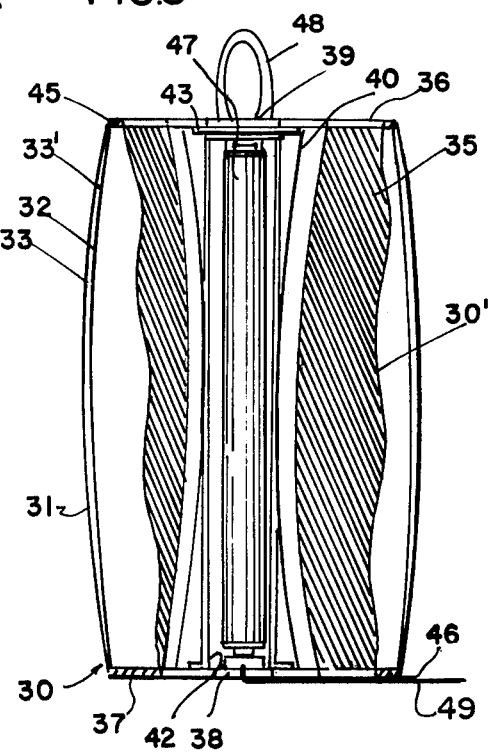
FIG. 7 is a side view of an inflatable structure containing a lamp disposed therein and printed matter arranged to generate interference effects in accordance with the instant invention.

In FIG. 7 is shown an inflated enclosure 30 containing, in addition to means for generating interference bands of moving optical effects as described, an internally mounted elongated electric lamp for illuminating the enclosure from the interior thereof. The inflatable enclosure 30 is composed of a side wall 31 made of inner and outer flexible transparent plastic wall portions 32 and 33 which are peripherally sealed along circular seal lines 45 and 46 to end walls 36 and 37 containing or composed of rigid disc-shaped members to maintain said end walls substantially flat. The side wall members 32 and 33 are preferably maintained slightly apart by gas pressurizing the interior volume of the inflatable enclosure which gas also pressurizes the volume 33' between the wall portions 32 and 33 by means of a hole or holes in the inner wall portion 33. Thus, if grid lines are provided on both the inner and outer wall portions 32 and 33, as shown in FIGS. 1–3, interference as well as movement effects may be created to an observer looking through the enclosure. Grid lines 35 are shown printed on the outer wall 33 and may be angulated with respect to grid lines on the inner wall 32 to generate interference bands. Similarly, screen-like formations may be printed on both walls or on opposite walls of the enclosure 30 to provide, for example, movement effects of the type generated by the devices of FIG. 4.

The end walls 36 and 37 of the enclosure each contain respective circular openings 38 and 39 centrally located therein and a tubular formation 40 of flexible plastic extends between said end walls and seals thereto to provide, in effect, an annular cylindrical enclosure with a central passageway extending therethrough. Because it is flexible, the central tubular member 40 has a tendency to be deformed inwardly when the inflatable enclosure is inflated. Notation 42 refers to a rigid, transparent tube of plastic extending longitudinally through the passageway in the inflatable assembly and is compressively engaged by the inwardly deformed flexible tube 40 when the enclosure is inflated. Thus, inflation of the enclosure 30 serves to frictionally retain the rigid plastic tube in place, although other means may also be provided for holding said tube in place such as the provision of flanges or fittings 43 at both ends thereof. Disposed within tube 42 is a fixture containing an elongated electric light 47 such as a fluorescent light. The fixture contains a wire 49 extending therefrom and along the bottom wall of the inflatable enclosure for providing electrical energy for energizing lamp 47. The lamp 47 may comprise any suitable electric light extending partly or completely through the transparent tube 42 or may also comprise a plurality of individual electric lights suspended or otherwise secured therein.

Notation 48 refers to a ring loop secured to the end wall 36 of the inflatable enclosure which may be utilized to hang the assembly 30 as a lamp or display.

By providing openings 38 and 39 in the end walls 36 and 37 of the assembly 30, air may circulate through the centrally disposed passageway therein for transferring heat from the electric lamp to prevent overheating thereof.

Modified forms of the instant invention include the following embodiments:

I. The composite structures illustrated in the drawings may be modified whereby the inflated, pocket-like formations which protrude outwardly and inwardly of the selfsupported wall portions of the container may each comprise a separate inflated or inflatable tube or array of inflated pockets formed between two sheets of plastic or opposite walls of a tubular plastic extrusion. In other words, the envelopes or pocket-like formations may first be made of extruded or otherwise formed flexible tubes or sheets of flexible plastic sealed together and fastened to the rear wall portion or portions of the container thereafter.

II. The inflated, pocket-like formations may also contain one or more valves for inflating same and allowing the air to escape when desired. For example, if the inflated formations protrude into the container storage compartment, they may be inflated after inserting an article or articles within the container so as to compress against and frictionally retain the contents in position within the container. When it is desired to remove the contents from the container the valve may be opened, permitting gas to escape and the inflated formations to deflate. Similarly, if one or more valves are provided for the externally protruding inflated formations, air or gas under pressure may be applied through the valve or valves after a plurality of containers have been disposed within a master carton or vehicle body to compress against the walls of adjacent containers and the walls of the vehicle to jam the containers tightly in place. When it is desired to remove the containers from the carton or vehicle body, the valve or valves may be opened to allow air to escape.

In constructions involving relatively heavy walled inflatable envelopes assembled to container walls, they may be adhesively bonded thereto or secured with fasteners extending between flange portions of the inflatable tubes or pocket-like formations.

I claim:

1. An inflatable structure comprising:
   an enclosure made substantially of flexible sheet material and capable of retaining a gas under pressure,
   said enclosure having opposed walls which are joined together and define respective first and second wall portions disposed so as to be predeterminately retained apart in fixed relation with respect to each other when the enclosure is internally gas pressurized and inflated,
   said first wall portion being disposed to face an observer in front of said second wall portion,
   a transparent part of said first wall portion through which said second wall portion of said enclosure may be viewed by an observer looking through said first wall portion of said enclosure,
   part of said second wall portion of said enclosure which is viewable through said transparent part of said first wall portion being printed with first indicia defining areas thereof which are interposed between areas therebetween of different light contrasting characteristics than the characteristics of said first indicia,
   second indicia printed on said transparent part of said first wall portion and arranged for cooperating with the images of said indicia printed on said second wall portion when viewed by an observer through said first wall portion,
   said first and second indicia being shaped and disposed on said first and second wall portions so as to provide a dynamic display effect which appears to move to an observer as the angle between the line of sight of the observer and said enclosure varies by the relative movement of either with respect to the other.

2. A structure in accordance with claim 1, wherein said first and second wall portions comprise opposite walls of said enclosure.

3. A structure in accordance with claim 1, wherein said first wall portion defines part of the outside wall of said enclosure and said second wall portion is enclosed within the envelope formed by the walls of said enclosure.

4. A structure in accordance with claim 3, wherein said first wall portion is formed of a section of transparent sheet material sealed to a wall of said enclosure and said second wall portion is an extension of the wall to which said first wall portion is sealed.

5. A structure in accordance with claim 4, including an opening in said second wall portion communicating the volume interior of the enclosure with the volume between said first and second wall portions whereby both may be inflated by applying gas pressure to either.

6. A structure in accordance with claim 1, wherein one of said first and second indicia comprises parallel bands of printed matter.

7. A structure in accordance with claim 1, wherein both said first and second indicia comprise parallel bands of printed matter which interfere with each other and mutually generate a moving effect to an observer as the observer and inflated structure relatively move.

8. A structure in accordance with claim 1, wherein said first and second indicia comprise respective printed grid patterns.

9. A structure in accordance with claim 1, wherein one of said first and second indicia comprises bands of opaque printed matter which extend outwardly from a central area.

10. An inflatable structure comprising:
    an enclosure made of flexible sheet material and capable of retaining a gas under pressure,
    a section of transparent plastic sheet material fixedly sealed to a wall of said enclosure across a first portion of said wall, said first portion of said wall beneath said transparent sheet material containing first indicia printed thereon and a second indicia printed on said section of transparent plastic sheet material,
    said section of transparent plastic sheet material being sealed to said wall of said enclosure so as to define a confined volume between said transparent sheet material and a portion of the wall of said enclosure,
    an opening in said first portion of said wall of said enclosure beneath said transparent sheet material communicating the volume interior of said enclosure with the volume between said section of transparent sheet material and said wall of said enclosure whereby both said volumes may be simultaneously inflated by applying a gas under pressure to either of said volumes.

* * * * *